United States Patent [19]
Payen

[11] 3,723,672
[45] Mar. 27, 1973

[54] ELECTRICAL DISTRIBUTION AND CURRENT COLLECTING SYSTEM FOR A HIGH SPEED VEHICLE

[75] Inventor: Jean-Pol Payen, Grenoble, France

[73] Assignee: Merlin Gerin, Societe Anonyme, Grenoble, France

[22] Filed: Oct. 6, 1970

[21] Appl. No.: 78,414

[30] Foreign Application Priority Data

Sept. 18, 1970 France..................................7034718
Sept. 18, 1970 France..................................7034719
Sept. 18, 1970 France..................................7034717

[52] U.S. Cl..........................................191/50, 191/45
[51] Int. Cl. ..............................................B60l 5/00
[58] Field of Search......191/45 R, 50, 46, 63, 22, 29, 191/33

[56] References Cited

UNITED STATES PATENTS 3,152,673  10/1964  Duffy.....................................191/45
3,405,240  10/1968  Kilburg..............................191/45 R Primary Examiner—Gerald M. Forlenza
Assistant Examiner—Richard A. Bertsch
Attorney—Stevens, Davis, Miller & Mosher

[57] ABSTRACT

Current collecting system for a high speed vehicle movable along a track. A multi-phase conductor system extends along the track and defines a passageway for a movable collector head. The collector head comprises retractable contact shoe means capable of resilient engagement with the conductors. Linkage means connecting the collector head to the vehicle permit to withdraw the collector head from the passageway and to stock it in a housing in a non-operative position. Movable contact means connect the collector head electrically to the vehicle and allow relative movement of the collector head with respect to the vehicle.

22 Claims, 4 Drawing Figures

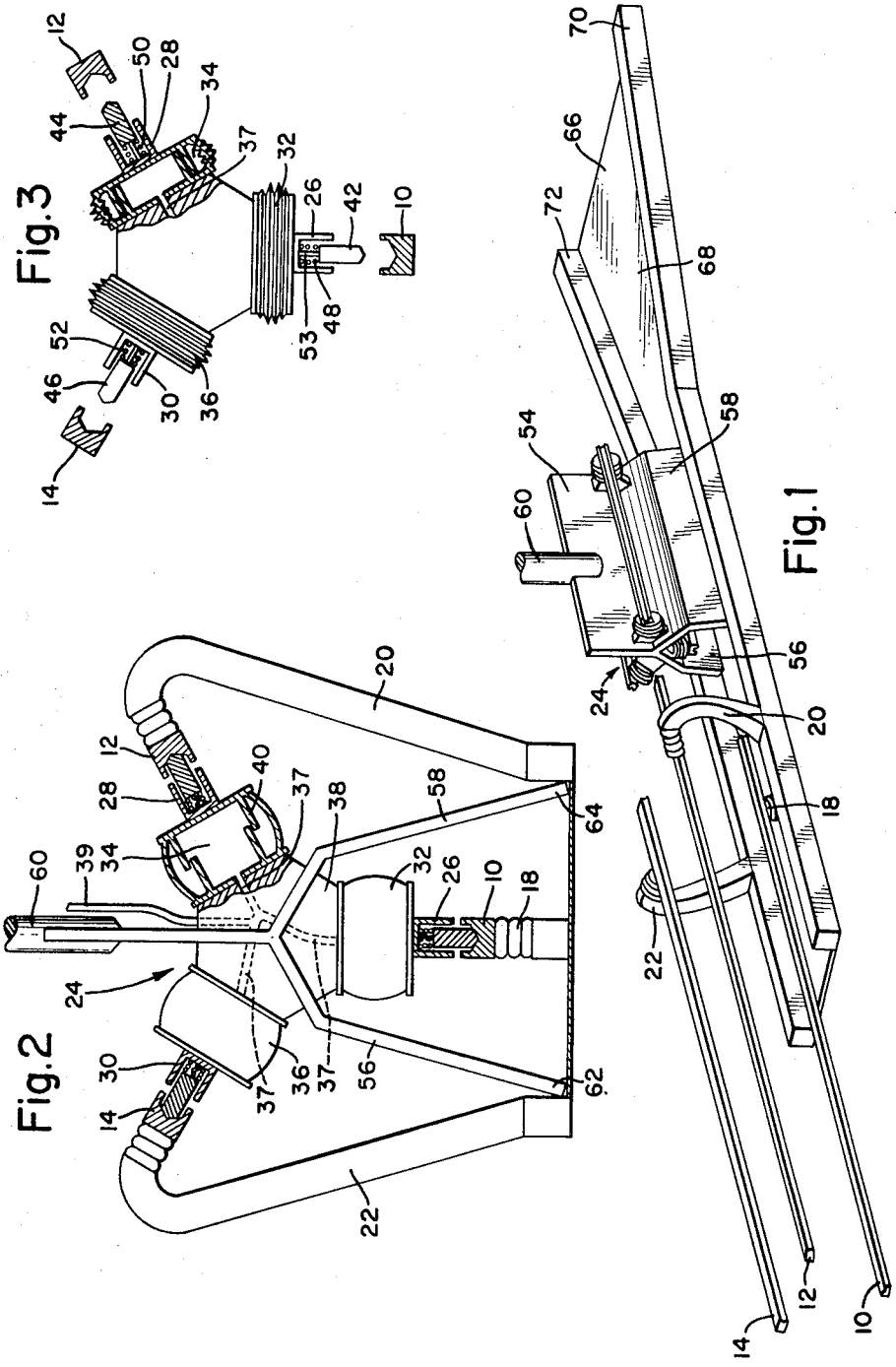

ELECTRICAL DISTRIBUTION AND CURRENT COLLECTING SYSTEM FOR A HIGH SPEED VEHICLE

This invention relates to an electrical distribution and current collecting system for a high speed vehicle, such as a high speed linear motor driven vehicle supported from a trackway by means of pressurized air cushion. In systems of the kind concerned by the invention, a plurality of parallel, multi-phase energizable conducting rails define a passageway for a collector head linked to the vehicle. The collector head comprises contact shoe means which are resiliently urged into engagement with the conductors. The conductors extend along the trackway of the vehicle and guide the collector head. This propelling mode is suitable to urban traveling but may be unsuited for example for open country transportation where a jet- or propeller type propulsion entails a less expensive understructure.

It is an object of the invention to provide means permitting to render said collector head non-operative thus allowing other propelling means to become operative.

It is another object of the invention to provide means to withdraw said collector head from said passageway in a retracting position.

Still another object of the invention is to guide said collector head into said passageway.

Another object of the invention is to improve the electrical and mechanical connection of said collector head to said vehicle.

Still another object of the invention is to improve the aerodynamic behavior of the collector head.

Another object of the invention is to provide visible isolating means in the electrical connection of said collector head to said vehicle.

Another object of the invention is to provide simple combined retraction and driving means for the collector head allowing for relative movement between the collector head and the vehicle.

These and other objects will become apparent upon reading of the following description given with reference to the accompanying drawings, in which:

FIG. 1 is a schematic perspective end view of a current collector track in accordance with the invention, showing a collector head being engaged on said track;

FIG. 2 is a schematic end view of the device of FIG. 1, shown partially in section so as to show the retracting device for the collecting contact shoes;

FIG. 3 is a view similar to FIG. 2, showing the collector head in retracted position, the guide and support members having been omitted;

Figure 4:
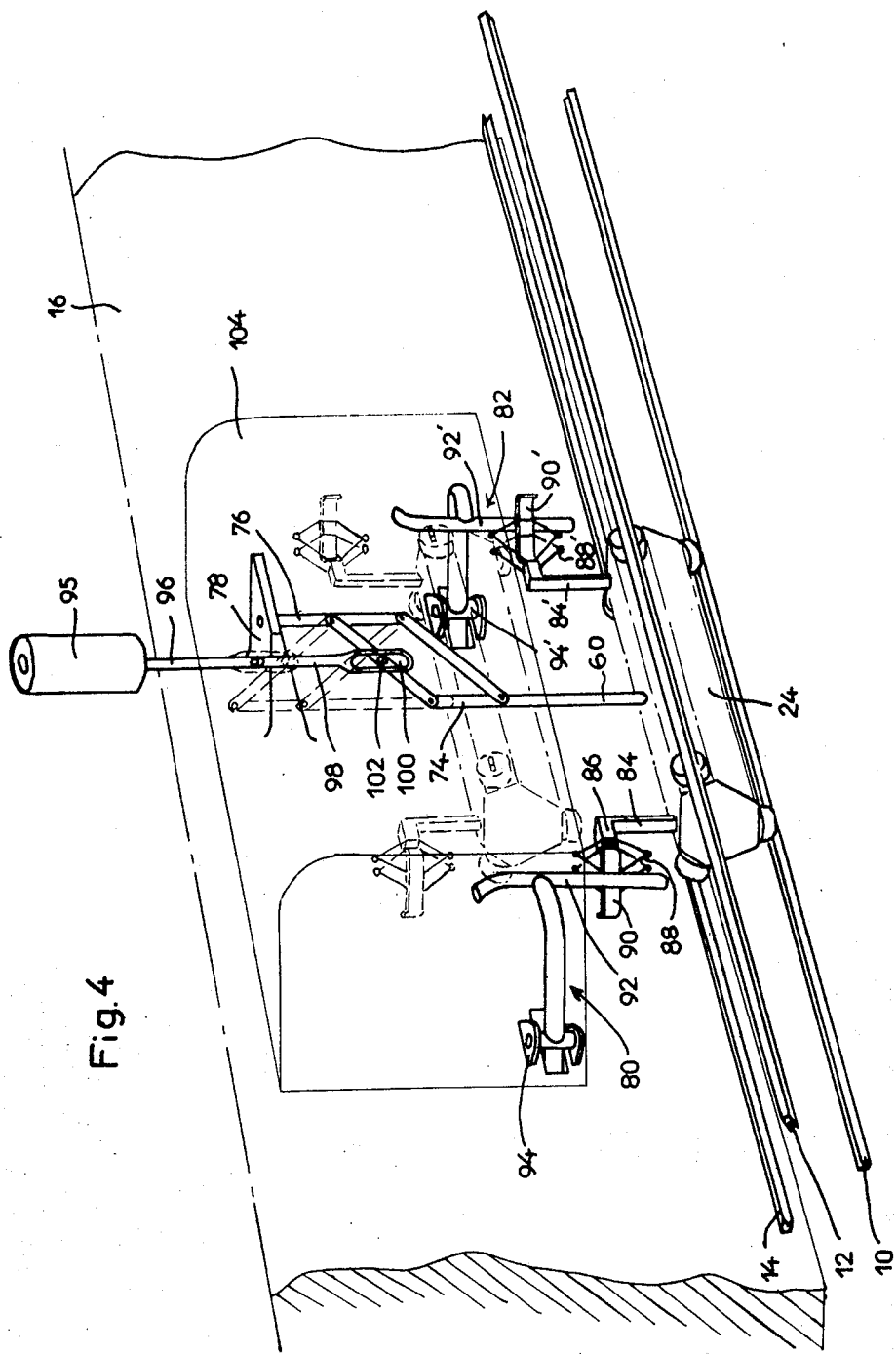
FIG. 4 is a schematic perspective view of a current collecting device with withdrawable collecting head.

In the figures an electric multi-phase current feed track is formed of three conductor rails 10, 12 and 14 arranged in a triangle and extending parallel to the path of a vehicle 16 of which only the side part has been shown partially in FIG. 4. The vehicle 16 can be propelled by an electric motor, for instance a linear motor (not shown), fed by the rails 10, 12 and 14. The speed of displacement of the vehicle may reach several hundreds of miles per hour, and it may be of the fluid-cushion supported type, currently referred to as an "air train".

The rails 10, 12 and 14 are fastened to insulating supports 18, 20 and 22 which are staggered along the collector track which extends parallel to the path (not shown) of the vehicle 16. Within the passageway defined by the conductors 10, 12 and 14 a prismatic current collecting head designated generally as 24 can slide. The assembly is so arranged that the collector head 24 is guided in its displacement solely by the rails 10, 12 and 14, via the current collecting contact shoes.

The collector head 24 has three support elements 26, 28, 30 in the form of members of U-shaped profile, the opening side of which faces the rails 10, 12 and 14, respectively, and which extend parallel to the latter over a certain length. The three U-shaped profiled members 26, 28, 30 are borne by bellows or fluid-operated expandable members 32, 34, 36 rigidly connected to the body or web portion 38 of the collector head 24. Each bellows 32, 34, 36 comprises a side wall of flexible material, such as an elastomer, which confines a closed space communicating with a control tubing 37 capable of introducing or removing air or any other gas in the enclosure of the bellows. The control conduit 37 is connected by a flexible conduit 38 to a source of pressurized gas (not shown) carried by the vehicle. Within each bellows 32, 34, 36 there are arranged telescopic guide elements 40 which assure a linear movement of retraction or expansion of the bellows as a function of the volume of gas enclosed in the bellows. An elastic system, such as a spring (not shown), can be incorporated in the bellows so as to modify the value of the pressure of the gas causing the expansion or contraction of the bellows.

Between the flanges of the U-shaped profiled members 26, 28, 30 there are inserted current collecting contact shoes in the form of brushes 42, 44, 46 which are urged into contact with the feed rails 10, 12, 14 by compression springs 48, 50, 52 inserted between the base of the profiled members and the base of the contact shoes. A flexible strip 53 of suitable length maintains each contact shoe 42, 44, 46 in its housing against the action of the spring 48, 50, 52 when the contact shoes are separated from the associated contact rails 10, 12, 14, particularly as a result of the contraction of the bellows 32, 34, 36. The strips 53 may be of conductive material and electrically connect the contact shoes 42, 44, 46 to the conducting carrying structures 26, 28 and 30 respectively. A plurality of contact shoes are advantageously longitudinally staggered along each support in such a manner as to maintain a collecting of current under any condition. The contact surfaces of the shoes and of the associated rails, of corresponding shape, are advantageously of V shape so as to favor self-guidance by interfitting of the contact shoes during the displacement of the collector head 24 along the track 10, 12, 14.

It is easy to see that in active position of the bellows 32, 34, 36 supporting the contact shoes 42, 44, 46, the collector head 24 is centered with respect to the feed track 10, 12, 14 by the action of the shoes 42, 44, 46. The collector head 24 is guided exclusively by the shoes during its displacement, particularly at high speed, along the track 10, 12, 14.

The body 24 of the collector head may be a solid right prism of insulating material or be formed of two transversely extending end web portions, each bearing three support bellows of the profiled members 26, 28, 30, the hollow central portion of the collector head being available for the passage of the connecting conductors (not shown), such as flexible cables extending between the collector head and the vehicle. To the body 24 there are fixed three fins or wing members in the form of a substantial radial plates 54, 56, 58, extending between the supports 26, 28, 30 so as to protrude between the conductors 10, 12, 14 of the track. The radial fins 54, 56, 58 are advantageously made of insulating material which improves the electrical insulation between the different phases of the collector head 24. The upper fin 54 may receive the traction link 60, which may advantageously be of the pantograph type, and will be described in further detail with reference to FIG. 4. The lower edges 62, 64 of the fins 56, 58 protruding downward from the collector head 24 constitute guide surfaces capable of cooperating with stationary guide means 66 rigidly connected with the track 10, 12, 14. The guide means 66 are arranged at the entrance of the collector passageway in order to facilitate the centering of the collector head 24 and thereby its insertion into the passageway. The guide means 66 have a lower sliding plate 68 for the edges 62, 64 of the fins rigidly connected with the collector head 24 so as to maintain the collector head at a level corresponding to that of the rails 10, 12, 14. The plate 68 is laterally bounded by wall portions 70, 72 which converge in the direction towards the entrance of the passageway 10, 12, 14 so as to center the collector head 24 laterally by acting on the guide surfaces 62, 64. It is easy to see that the guide device of this type permits insertion of the collector head during displacement of the vehicle. The device of FIGS. 1 to 3 operates in the following manner:

For insertion of the collector head 24, a retraction is effected of the contact shoes 42, 44, 46 by placing the bellows 32, 34, 36 under vacuum in the manner shown in FIG. 3. The contact shoes 42, 44, 46 are retained by strips 53 and the contraction of the carrying structures 26, 28, 30 is sufficient to provide a clearance which prevents any undesired contact between the contact shoes and the associated rails upon the placing of the collector head on the track. In the transition zone, corresponding, for instance, to the end of travel of a section for propulsion by aerodynamic motor and the beginning of a section of track for propulsion by electric motor, the collector head 24 is brought by any suitable means into position on the guide plate 68 which positions it at a height suitable for the introduction thereof between the rails 10, 12, 14. When the collector head leaves its center position, one of the guide edges 62, 64 comes into contact with one of the convergent guides 70 or 72 which applies to it a centering force which positions the collector head in suitable position during its advance. Upon the insertion of the collector head on the passageway 10, 12, 14, the pressure is reestablished in the bellows 32, 34, 36 so as to cause their expansion and the application of the contact shoes 42, 44, 46 against the associated rails 10, 12, 14. The collector head continuing on its path, the guide surfaces 56, 58 move away from the guide 66, the guiding being resumed in the customary manner by the contact shoes 42, 44, 46.

In FIG. 4 is shown a contractile collector head 24 which may be of the type described with reference to FIGS. 1 to 3, engaged in a collector track 10, 12, 14. The collector head 24 is mechanically connected to the vehicle 16 by a traction device 74 of the pantograph type. One of the vertical sides 76 of the pantograph 74 is mounted for rotation about a vertical axis on a support device 78 of the vehicle 16, while the other vertical rod 60 is fastened at its end via a universal joint of the ball and socket type (not shown) to the collector head 24. The pantograph connection 74 effects a filtering of the forces transmitted to the collector head which is subjected to a large extent only to a tractive force directed substantially in the direction of the track 10, 12, 14.

FIG. 4 also shows an electric connecting device between the collector head 24 and the vehicle 16 which is practically insensitive to aerodynamic effects even at high speeds of travel. In the example described, the feed track comprises three conductors 10, 12, 14, each corresponding to one phase of a three phase feed current. It will be understood that the number of conductors might be different and might correspond to any polyphase current. In the case of three-phase current, one of the phases may be transmitted via the pantograph 74 formed of suitable conductive material. In this case, the collector head is equipped with two electrical contact devices 80, 82 arranged, for instance, on opposite sides of the pantograph 74 and only one of which, 80, will be described below since the other one is identical, corresponding parts being provided with the same reference numbers provided with a prime mark. The collector head 24 bears a rigid output terminal conductor in the form of a bar 84 protruding vertically upward and electrically connected to one of the carrying structures 26, 28 or 30, i.e., to the contact shoes engaging one of the conductors 10, 12, 14. The rod 84 carries at its upper end 86 an elastic contact device of the pantograph type 88 directed laterally and bearing a contact shoe 90. The contact shoe 90 has an elongated sole plate which extends horizontally and transversely of the collector track 10, 12, 14. The pantograph 88 urges the sole plate of the shoe 90 into contact with a rigid rod 92 mounted for rotation about a vertical axis via pivot means 94, constituting an input terminal of the vehicle 16. The contact rod 92 has a vertical linear portion of a height sufficient to compensate for the usual vertical movement of the collector head in such a manner that the electrical contact with the sole plate of the shoe 90 remains assured in any relative position of the collector head with respect to the vehicle 16. In similar manner the length of the sole plate of the shoe 90 is adapted to the value of the lateral movements capable of occurring in normal operation of the system. It will be understood that the contact between the rigid rods 84 and 92 could be effected by any other elastic system or possibly by a flexible conductor the ends of which would be fastened respectively to the rods 84 and 92. The pantograph 88 or the contact system could also be connected with the rod 92 borne by the vehicle 16 and rest against a vertical rod 84 borne by the collector head, the height of which would, of course, be sufficient to maintain the electrical contact, whatever the vertical movements of the collector head 24.

The articulation 94 with vertical axis permits a pivoting of the rigid conductor or rod 92 which allows the rods 84 and 92 to move to and from each other substantially so as to create a visible disconnecting interval. The disconnecting control is effected by any suitable mechanism either manually or automatically in a manner which, as it does not form part of the invention, will not be described.

On the sections of the track on which the collector head is not used, it is advantageous, in order to decrease the resistance to advance of the vehicle, to withdraw the collector head 24, preferably within a streamlined housing.

FIG. 4 shows a device for the lifting of the collector head 24 which employs a fluid operated jack 95 the piston rod 96 of which is capable of imposing, via a pivotally connected rod 98, a deformation on the traction pantograph 74 which is sufficient for the lifting of the collector head. The link 98 bears a vertical slot 100 in which slides a crank pin 102 borne by a link of the pantograph 74 in such a manner that in normal operation the deformation resulting from the vertical movements of the vehicle 16 do not interfere with the lifting device 95, 96 and 98. The collector head 24 is preferably arranged in such a manner as to permit sufficient retraction of the contact shoes to permit withdrawal of the collector head through the space provided between the two upper rails 12 and 14. The disengagement of the contact shoes from the conductors is of course effected by the compressible bellows described in connection with FIGS. 1 to 3.

The operation of the device shown in FIG. 4 is as follows:

In normal travel the collector head 24 is pulled by the vehicle 16 via the pantograph 74 which transmits to it a traction force which is oriented substantially in the direction of the track 10, 12, 14. The current collected by the shoes in contact with the feed rails 10, 12, 14 is transferred to the vehicle 16, for one phase, by the tractive pantograph 74 and, for the other phases, by the contact devices 80 and 82. A visible disconnecting of the switches can be obtained by simple pivoting of the conductors 92, 92' around their support pin 94, 94'. An ordinary disconnecting device (not shown) can also be inserted in the pantograph connection 74. In order to lift the collector head 24, a retraction of the shoes is brought about by creating a vacuum within the bellows supporting them. It is also advantageous to move away, by pivoting, the rods 92, 92' which thus free the pantographs 88 and 88'. Nothing further opposes the lifting of the collector head which escapes through the space provided between the upper rails 12 and 14. The lifting movement is effected by the jack 95 which may be a simple pneumatic piston jack the rod 96 of which raises the connecting rod 98 and, after travel through the dead stroke resulting from the lost motion slot 100, results in a pivoting and lifting of the traction arms of the pantograph 74 which is transmitted by the rod 79 to the collector head 24. In raised position the collector head comes within a housing schematically represented in FIG. 4 by a hood 104. It is obvious that the hood 104 can be profiled and/or form part of the cabine of the vehicle 16.

It will be understood that the lifting device might be of different type, for instance actuated by electric motor or by direct action on the collector head 24. The lifting movement could be composite, for instance a movement of translation for the phase of the removal of the collector head from the track 10, 12, 14, followed by a movement of rotation for retraction within the cab. The removal or the placing on the track of the collector head 24 can, of course, be effected at the end of the collector track in the manner shown in FIG. 3.

What is claimed is:

1. A multi-phase electrical distribution and current collecting system for a high speed vehicle movable along a track, comprising a movable collector head and a plurality of stationary multi-phase energizable conductors extending parallelly along at least a part of said track and circumferentially spaced apart to define a passageway for said collector head, each conductor including an inwardly facing longitudinally extending contact surface for electrically feeding and mechanically guiding said collector head; said collector head comprising contact shoe means for each of said conductors shaped for engagement with the contact surface thereof, a plurality of movable carrying structures for said contact shoe means, one for each conductor and extending substantially parallelly thereto, each carrying structure resiliently supporting the contact shoe means engaging the corresponding conductor, and control means supporting said carrying structures, said control means being adapted to positively retract and expand in normal service said carrying structures substantially perpendicularly to said conductors bringing said contact shoe means selectively out of and into engagement with said contact surfaces.

2. A system according to claim 1, said control means comprising fluid operated expandable means.

3. A system according to claim 2, said expandable means comprising bellows means.

4. A system according to claim 1, further comprising stationary guide means for guiding said collector head having retracted contact shoe means into the entrance of said passageway.

5. A system according to claim 4, said stationary guide means comprising converging wall means.

6. A system according to claim 1, said collector head comprising longitudinal extending aerodynamic wing means.

7. A system according to claim 6, said wing means being of insulating material and projecting substantially from the center of said collector head between said conductors.

8. A system according to claim 6, further comprising stationary guide means cooperating with said wing means for guiding said collector head into the entrance of said passageway.

9. A three-phase electrical distribution and current collecting system for a high speed vehicle movable along a track, comprising three substantially equidistant and parallel three-phase energizable rails of conducting material, defining a passageway parallel to at least a part of said track, a collector head movable in said passageway, said collector head comprising three sets of contact shoe means shaped for engagement with said rails, respectively, in electrical contact and mechanical guide relationship therewith, and control means urging said contact shoe means simultaneously selectively into resilient engagement with said rails and out of engagement therewith.

10. A system according to claim 9, said collector head further comprising substantial radial guide means for said contact shoe means, said control means controlling the centripetal and centrifugal movement of said contact shoe means.

11. A system according to claim 9, said control means comprising fluid operated expandable means.

12. A multi-phase electrical distribution and current collecting system for a high speed vehicle movable along a track, comprising a movable collector head; a plurality of stationary multi-phase energizable rails of conducting material extending parallelly along at least a part of said track and defining a passageway for said collector head; said collector head comprising contact shoe means shaped for engagement with said rails in electrical contact and mechanical guide relationship therewith, said collector head further comprising carrying structures for resiliently urging said contact shoe means into engagement with said rails; linkage means connecting said collector head to said vehicle in driving relation; housing means on said vehicle for accommodating said collector head in non-operative position, said linkage means being adapted to move said collector head between an operating position in said passageway and a non-operating position out of said passageway.

13. A system according to claim 12, said linkage means comprising pantograph means.

14. A system according to claim 12, said linkage means being fluid operated.

15. A system according to claim 12, said linkage means comprising lost motion means.

16. A multi-phase electrical distribution and current collecting system for a high speed vehicle movable along a track, comprising a movable collector head, a plurality of stationary multi-phase energizable parallel conductors defining a passageway for said collector head along said track, contact shoe means on said collector head shaped and supported for engagement with said conductors in electrical contact relation therewith, said conductors guiding said collector head in said passageway, linkage means connecting said collector head to said vehicle, means to retract said contact shoe means from said conductors, and means to retract said collector head transversely from said passageway.

17. A system according to claim 12, said linkage means comprising members of conductive material operative to transfer to said vehicle the current collected from one of said rails.

18. A multi-phase electrical distribution and current collecting system for a high speed vehicle movable along a track, comprising a movable collector head, a plurality of stationary multi-phase energizable parallel conductors defining a passageway for said collector head along at least a part of said track, contact shoe means on said collector head shaped and supported for engagement with said conductors in electrical contact relation therewith, linkage means connecting said collector head to said vehicle, a plurality of rigid spaced apart output terminal rods electrically connected to said contact shoe means and projecting from said collector head, a corresponding plurality of input terminals on said vehicle and movable electrical contact devices between said rods and said input terminals.

19. A system according to claim 18, said rods extending substantially parallelly, longitudinally spaced apart on said collector head.

20. A system according to claim 18, said contact devices comprising each a pair of substantially perpendicularly extending contact rods and elastic means to urge said contact rods resiliently together.

21. A system according to claim 20, one of said contact rods being secured to said vehicle, the other contact rod being carried by said collector head.

22. A system according to claim 18, said contact devices comprising disconnecting switches having a visible isolating contact member.

* * * * *